(12) United States Patent
Qi et al.

(10) Patent No.: US 10,596,563 B2
(45) Date of Patent: Mar. 24, 2020

(54) SINTER-RESISTANT STABLE CATALYST SYSTEMS BY TRAPPING OF MOBILE PLATINUM GROUP METAL (PGM) CATALYST SPECIES

(71) Applicant: GM Global Technology Operations LLC, Detroit, MI (US)

(72) Inventors: Gongshin Qi, Troy, MI (US); Ming Yang, Troy, MI (US); Ryan J. Day, Waterford, MI (US); Xingcheng Xiao, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/418,214

(22) Filed: Jan. 27, 2017

(65) Prior Publication Data
US 2018/0214859 A1    Aug. 2, 2018

(51) Int. Cl.
*B01J 37/02* (2006.01)
*B01J 35/00* (2006.01)
(Continued)

(52) U.S. Cl.
CPC .......... *B01J 37/0244* (2013.01); *B01J 21/04* (2013.01); *B01J 23/44* (2013.01); *B01J 23/63* (2013.01);
(Continued)

(58) Field of Classification Search
CPC . B01J 37/035; B01J 21/04; B01J 23/42; B01J 23/44; B01J 35/0013; B01J 37/08; B01J 37/18
See application file for complete search history.

(56) References Cited

U.S. PATENT DOCUMENTS

| 3,656,915 A | 4/1972 | Tourtellotte |
| 7,163,963 B2 | 1/2007 | Frankel |

(Continued)

FOREIGN PATENT DOCUMENTS

| CA | 1323360 C | 10/1993 |
| CN | 102909005 A | 2/2013 |

(Continued)

OTHER PUBLICATIONS

Liang et al.; "Stabilization of Supported Metal Nanoparticles Using an Ultrathin Porous Shell" ACS Catal., 2011, 1 (10), pp. 1162-1165, Aug. 15, 2011.
(Continued)

*Primary Examiner* — James A Fiorito
(74) *Attorney, Agent, or Firm* — Harness, Dickey & Pierce, P.L.C.

(57) ABSTRACT

Methods of preparing a sinter-resistant catalyst include forming a dual coating system. A surface of a particulate catalyst support contacts a first liquid precursor including a metal salt with an element selected from the group consisting of: aluminum (Al), cerium (Ce), zirconium (Zr), titanium (Ti), silicon (Si), magnesium (Mg), zinc (Zn), and combinations thereof. The first liquid precursor precipitates or is adsorbed as an ion on a portion of the surface forming a first coating including a porous metal oxide on the surface. The surface may be contacted with a second liquid precursor including a metal oxide sol including a metal selected from the group consisting of: aluminum (Al), cerium (Ce), zirconium (Zr), iron (Fe), titanium (Ti), silicon (Si), and combinations thereof. A second coating is formed from the second liquid precursor on a portion of the surface to create the sinter-resistant catalyst system.

10 Claims, 7 Drawing Sheets

(51) Int. Cl.

| | |
|---|---|
| *B01J 23/63* | (2006.01) |
| *B01J 23/83* | (2006.01) |
| *B01J 21/04* | (2006.01) |
| *B01J 23/44* | (2006.01) |
| *B01J 35/04* | (2006.01) |
| *B01J 37/00* | (2006.01) |
| *B01J 37/03* | (2006.01) |
| *B01J 37/08* | (2006.01) |

(52) U.S. Cl.
CPC ............ *B01J 23/83* (2013.01); *B01J 35/0013* (2013.01); *B01J 35/04* (2013.01); *B01J 37/009* (2013.01); *B01J 37/0236* (2013.01); *B01J 37/0242* (2013.01); *B01J 37/035* (2013.01); *B01J 37/08* (2013.01)

(56) References Cited

U.S. PATENT DOCUMENTS

| | | | |
|---|---|---|---|
| 9,314,771 B2 | 4/2016 | D'Souza et al. | |
| 9,649,627 B1 | 5/2017 | Xiao et al. | |
| 9,731,273 B2 | 8/2017 | D'Souza et al. | |
| 9,901,907 B1 | 2/2018 | Xiao et al. | |
| 10,376,872 B2 | 8/2019 | Xiao et al. | |
| 2004/0232049 A1 | 11/2004 | Dath et al. | |
| 2005/0170957 A1 | 8/2005 | Maus et al. | |
| 2006/0120936 A1* | 6/2006 | Alive ................ | B01D 53/944 423/215.5 |
| 2010/0248957 A1 | 9/2010 | Takeshima et al. | |
| 2011/0311422 A1 | 12/2011 | Bentele et al. | |
| 2013/0267411 A1 | 10/2013 | Woodfield et al. | |
| 2017/0095795 A1 | 4/2017 | Xiao et al. | |
| 2017/0095796 A1 | 4/2017 | Qi et al. | |
| 2017/0095806 A1 | 4/2017 | Qi et al. | |
| 2017/0095807 A1 | 4/2017 | Xiao et al. | |
| 2017/0114458 A1 | 4/2017 | Xiao et al. | |
| 2018/0111111 A1 | 4/2018 | Yang et al. | |
| 2018/0111112 A1 | 4/2018 | Yang et al. | |
| 2018/0185831 A1 | 7/2018 | Yang et al. | |
| 2018/0185832 A1 | 7/2018 | Xiao et al. | |
| 2018/0214860 A1 | 8/2018 | Qi et al. | |

FOREIGN PATENT DOCUMENTS

| | | |
|---|---|---|
| CN | 103191750 A | 7/2013 |
| CN | 105246590 A | 1/2016 |
| CN | 107020153 A | 8/2017 |
| CN | 108273497 A | 7/2018 |
| CN | 108273568 A | 7/2018 |
| CN | 108355649 A | 8/2018 |
| CN | 108371950 A | 8/2018 |
| DE | 102017101237 A1 | 8/2017 |
| DE | 102018100081 A1 | 7/2018 |
| DE | 102018100092 A1 | 7/2018 |
| DE | 102018101610 A1 | 8/2018 |
| DE | 102018101702 A1 | 8/2018 |

OTHER PUBLICATIONS

M. Astier et al.; "Sintering and Catalysis"; vol. 10 of the series Materials Science Research; G.C. Kuczynski (ed.), Sintering and Catalysis, Plenum Press, New York, 1975; pp. 63 and 64.

Xiao, Xingcheng et al.; U.S. Appl. No. 15/010,937, filed Jan. 29, 2016 entitled "Sinter-Resistant Low-Cost Catalysts Manufactured by Solution-Based Nanoparticle Coating Processes"; 30 pages.

Yang, Ming et al.; U.S. Appl. No. 15/399,151, filed Jan. 5, 2017 entitled "Ion Adsorption of Oxide Layers to Hinder Catalyst Sintering"; 44 pages.

Xiao, Xingcheng et al.; U.S. Appl. No. 15/399,179, filed Jan. 5, 2017 entitled "Solution-Based Approach to Make Porous Coatings for Sinter-Resistant Catalysts"; 46 pages.

Qi, Gongshin et al.; U.S. Appl. No. 15/419,263, filed Jan. 30, 2017 entitled "Highly Stable Platinum Group Metal (PGM) Catalyst Systems"; 37 pages.

First Office Action for Chinese Patent Application No. 201710043844.8 dated Jan. 21, 2019 with English language machine translation, 16 pages.

Sun, Zhenyu et al., "Thermal-Stable Carbon Nanotube-Supported Metal Nanocatalysts by Mesoporous Silica Coating," *Langmuir* 2011, 27, 10, pp. 6244-6251; DOI: 10.1021la1050871 (Published online: Apr. 11, 2011) (Abstract Only).

Lin et al. "The mechanism of reduction of cobalt by hydrogen." *Materials Chemistry and Physics*, 85 (2004), pp. 171-175.

Li et al., A sintering-resistant Pd/SiO2 catalyst by reverse-loading nano iron oxide for aerobic oxidation of benzyl alcohol, RSC Advances 5, 2015, pp. 4766-4769 (Published Dec. 10, 2014); DOI: 10.1039/c4ra14498h.

Xiao, Xingcheng et al., U.S. Appl. No. 16/454,709, filed Jun. 27, 2019 entitled "Solution-Based Approach to Make Porous Coatings for Sinter-Resistant Catalysts," 44 pages.

* cited by examiner

SINTER-RESISTANT STABLE CATALYST SYSTEMS BY TRAPPING OF MOBILE PLATINUM GROUP METAL (PGM) CATALYST SPECIES

INTRODUCTION

The present disclosure relates to catalysts that are resistant to sintering at high temperatures and improved methods for preparing catalysts that are resistant to sintering at high temperatures.

Metal nanoparticles can make up the active sites of catalysts used in a variety of applications, such as for the production of fuels, chemicals and pharmaceuticals, and for emissions control from automobiles, factories, and power plants. Catalyst systems typically include one or more active catalyst compounds that may be in the form of nanoparticles; a porous catalyst support material; metal or metal oxides nanoparticles, and one or more optional promoters. Catalyst metal nanoparticles tend to agglomerate, which decreases their surface area and active site accessibility, so they are often coupled to support materials. The supports physically separate the metal nanoparticles to prevent agglomeration, and to increase their surface area and active site accessibility.

After continued use, especially at elevated temperatures, catalyst systems including supported metal particles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of metal nanoparticles move or diffuse across a support surface, or through a vapor phase, coalesce with another nanoparticle, leading to nanoparticle growth. Ostwald ripening is another form of sintering where migration of mobile species are driven by differences in free energy and local atom concentrations on a support surface. After sintering processes occur, catalyst activity can decrease.

Therefore, catalyst systems are often loaded with a sufficient amount of supported catalyst metal particles to account for a loss of catalytic activity over time and to continue to have the ability to meet, for example, emissions standards over a long period of operation at high temperatures. It would be desirable to form catalyst systems having metal nanoparticle catalysts that have minimal or decreased sintering.

SUMMARY

This section provides a general summary of the disclosure, and is not a comprehensive disclosure of its full scope or all of its features.

The present disclosure relates to methods of preparing a sinter-resistant catalyst system. The method includes contacting a surface of a catalyst support in a particulate form with a first liquid precursor including a metal salt including an element selected from the group consisting of: aluminum (Al), cerium (Ce), zirconium (Zr), titanium (Ti), silicon (Si), magnesium (Mg), zinc (Zn), and combinations thereof. The first liquid precursor may be precipitated or adsorbed on a portion of the surface of the catalyst support and calcined to form a first coating that is a porous metal oxide on the surface. The surface may be contacted with a second liquid precursor including a sol. The sol may include a metal oxide selected from the group consisting of: aluminum (Al), cerium (Ce), zirconium (Zr), iron (Fe), titanium (Ti), silicon (Si), and combinations thereof. The method also includes forming a second coating including a metal oxide from the second liquid precursor on a portion of the surface of the catalyst support, so that the surface of the catalyst support includes the first coating and the second coating to create the sinter-resistant catalyst system. In this manner, the first coating and the second coating trap a mobile catalytically active species on the surface of the catalyst support.

In one aspect, the method further includes applying the sinter-resistant catalyst system as a washcoat layer over a monolith catalyst support.

In another aspect, the surface of the catalyst support includes at least one bound active catalyst particle disposed thereon prior to the contacting of the surface with the first liquid precursor.

In one aspect, the active catalyst particle includes a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof.

In one aspect, the contacting of the surface of the catalyst support with a first liquid precursor and the contacting of the surface with the second liquid precursor occur concurrently.

In another aspect, after the contacting of the surface of the catalyst support with the second liquid precursor, the method further includes filtering the catalyst support in the particulate form from a liquid, drying the catalyst support, and calcining the catalyst support.

In another aspect, the method may further include contacting the surface of the catalyst support with at least one active catalyst particle concurrently to the contacting with the first liquid precursor and the second liquid precursor.

In one aspect, the catalyst support is dispersed in a liquid medium including the first liquid precursor and the second liquid precursor to form a slurry.

In another aspect, the method may further include applying the slurry as a washcoat layer over a monolith substrate.

In one aspect, the contacting of the surface of the catalyst support with a first liquid precursor occurs prior to the contacting of the surface with the second liquid precursor.

In another aspect, after the contacting of the surface of the catalyst support with a first liquid precursor, the method further includes filtering the catalyst support in the particulate form from a liquid, drying the catalyst support, and then conducting the calcining, and then contacting of the surface with the second liquid precursor.

In yet another aspect, the calcining includes heating the catalyst and the metal oxide dispersed on the surface to greater than or equal to about 300° C. to less than or equal to about 600° C. for greater than or equal to about 2 hours.

In one aspect, the catalyst support includes a metal oxide selected from the group consisting of: aluminum oxide ($Al_2O_3$), cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one aspect, the metal salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

In one aspect, prior to the contacting of the surface of the catalyst support with a first liquid precursor, the method further includes pretreating the catalyst support by hydrothermally treating the catalyst support to a temperature of greater than or equal to about 800° C. to less than or equal to about 1,200° C. in the presence of water and air; and binding a catalyst particle with the surface of the catalyst support.

In certain other variations, the present disclosure contemplates a method of preparing a sinter-resistant catalyst system. The method may include contacting a surface of a catalyst in a particulate form with a first liquid precursor including an aluminum (Al) salt. The catalyst includes a catalyst support and an active catalyst material. The method may include precipitating or ion-adsorbing the first liquid precursor on a portion of the surface of the catalyst and calcining to form a first coating including a porous aluminum oxide on the surface. The surface is then contacted with a second liquid precursor including an aluminum-containing sol. Then, a second coating is formed that includes a porous alumina on a portion of the surface of the catalyst support created from the second liquid precursor. The surface of the catalyst includes the first coating and the second coating to create the sinter-resistant catalyst system. In this manner, the first coating and the second coating trap a mobile active catalyst material species on the surface of the catalyst.

In one aspect, the aluminum (Al) salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

In one aspect, the aluminum-containing sol includes aluminum hydroxide oxide ($AlO(OH)$) or bohemite phase aluminum oxide ($Al_2O_3$).

In one aspect, the aluminum (Al) salt includes aluminum nitrate ($Al(NO_3)_3$) and the second liquid precursor includes aluminum hydroxide oxide ($AlO(OH)$), nitric oxide, and water.

In one aspect, the active catalyst material may include a platinum group metal selected from the group consisting of: platinum (Pt), ruthenium (Ru), rhodium (Rh), palladium (Pd), osmium (Os), iridium (Ir), gold (Au), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
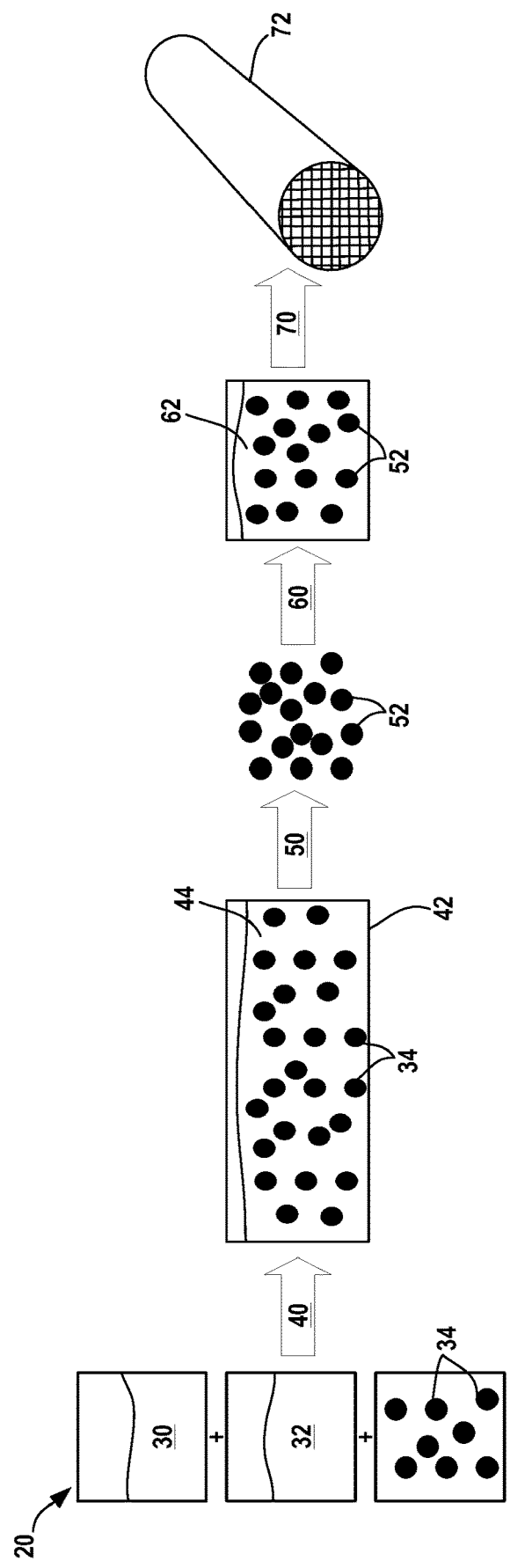
FIG. 1 is a schematic illustrating a method of forming a dual coating for a catalyst system according to certain aspects of the present technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides highly active and stable catalyst systems that include a dual coating system. A catalyst system may include a catalyst support, at least one catalytically active material that may be in the form of a particle disposed on active sites on a surface of the catalyst support, and one or more optional promotors. The stable catalyst systems provided by the present methods create a dual coating system including a nanoscale alumina material coating to physically separate active catalyst particles (e.g., platinum group metal (PGM) particles) on a surface of a catalyst support, as well as a metal oxide layer or coating formed from a sol that surrounds the catalyst support grains and active particles (e.g., occupies larger pores, like macropores), thus suppressing aging caused by sintering. Such a dual or hybrid coating system serves to minimize or suppress the two main PGM catalyst particle growth pathways by creating a nanoscale metal oxide (e.g., aluminum oxide) wall as a coating around each individual PGM catalyst particle; and also a metal oxide layer surrounding primary PGM catalyst/alumina grains. Such a dual coating system can not only effectively block the PGM particle migration through or across the surface of the catalyst support, but also suppress the PGM particle migration through the vapor phase. The first coating and the second coating thus trap a mobile catalytically active species on the surface of the catalyst support. In this manner, a catalyst having higher thermal durability is provided, which provides a highly active catalyst and/or reduces catalyst PGM loading requirements.

Accordingly, the present technology provides a solution-based approach for minimizing or eliminating the sintering process that may otherwise occur with catalyst nanoparticles on a surface of a catalyst support. This approach generates porous coatings selectively distributed on surfaces of catalyst supports (having catalyst active metal nanoparticles bound thereto), which decreases catalyst activity loss by suppressing aging caused by sintering. The current solution-based approach, relative to other chemistry-based approaches, is a wet-chemistry process, which results in a higher thermal durability and reduces catalyst metal loading requirements, which can potentially lead to significant cost savings.

Accordingly, the present technology provides a method for preparing a sinter-resistant catalyst system. The method may comprise contacting a surface of a catalyst support in a particulate form with a first liquid precursor. As will be described below, in certain variations the catalyst support surface does not yet have the active catalyst material disposed thereon, while in other variations, the catalyst support is a catalyst that includes the active catalyst material prior to contact with the first liquid precursor.

The catalyst support may comprise a metal oxide. The catalyst support may be in the form of a plurality of particulates (e.g., a powder). After treating the catalyst support particle by the methods described herein, a monolith substrate structure (e.g., a honeycomb structure) may be coated with a washcoat layer that includes the sinter-resistant catalyst particles formed by the methods described herein. In certain variations, the catalyst support may be formed of a metal oxide selected from the group consisting of: cerium oxide ($CeO_2$), aluminum oxide/alumina ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof. The catalyst support may further comprise dopants. The catalyst support may comprise dopants selected from the group consisting of barium (Ba), cerium (Ce), lanthanum (La), phosphorus (P), and combinations thereof.

The plurality of catalyst support particles (e.g., powder) may have an average particle diameter of greater than or equal to about 0.8 µm to less than or equal to about 5 µm, greater than or equal to 1 µm to less than or equal to about 4 µm, greater than or equal to 1.5 µm to less than or equal to about 3.5 µm, or greater than or equal to 2 µm to less than or equal to about 3 µm, such as a diameter of about 0.8 µm, 1 µm, 1.5 µm, 2 µm, 2.5 µm, 3 µm, 3.5 µm, 4 µm, 4.5 µm, or 5 µm.

Moreover, the catalyst support may have a surface area of greater than or equal to about 50 $m^2/g$ to less than or equal to about 150 $m^2/g$, greater than or equal to about 75 $m^2/g$ to less than or equal to about 125, $m^2/g$ such as a surface area of about 75 $m^2/g$, about 80 $m^2/g$, about 90 $m^2/g$, about 100 $m^2/g$, about 110, $m^2/g$ about 120 $m^2/g$, about 130 $m^2/g$, about 140 $m^2/g$, about 145 $m^2/g$, or about 150 $m^2/g$.

The first liquid precursor may comprise a metal salt. The metal salt may comprise an element selected from the group consisting of: aluminum (Al), cerium (Ce), zirconium (Zr), titanium (Ti), silicon (Si), magnesium (Mg), zinc (Zn), sodium (Na), potassium (K), barium (Ba), calcium (Ca), and combinations thereof. In certain variations, the metal salt comprises an element selected from the group consisting of: aluminum (Al), cerium (Ce), zirconium (Zr), titanium (Ti), silicon (Si), magnesium (Mg), zinc (Zn), and combinations thereof. In one variation, the metal salt comprises an aluminum (Al) salt.

As non-limiting examples, suitable salts of Al include $AlCl_3$, $Al(NO_3)_3$, $Al(OH)_3$, $Al_2(SO_4)_3$, $Al(ClO_3)_3$, $AlPO_4$, and $Al(PO_3)_3$; salts of Ce include $Ce(NO_3)_3$, $Ce(OH)_4$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Mg include $MgSO_4$, $Mg(NO_3)_2$, $MgHPO_4$, and $Mg_3(PO_4)_2$; salts of Zn include $Zn(NO_3)_2$, $Zn_3(PO_4)_2$, and $ZnSO_4$; salts of Ba include $BaCO_3$, $BaCl_2$, and $BaCrO_4$; salts of K include $KHSO_4$, $KCl$, $K_2CO_3$, $K_2CrO_4$, $K_2Cr_2O_7$, $KOH$, $KIO_3$, $KI$, $K_2MnO_4$, $KVO_3$, $K_2MoO_4$, $KNO_3$, $KClO_4$, $K_2S_2O_8$, $K_2HPO_4$, $K_4P_2O_7$, and $K_2SO_4$; salts of Na include $NaBr$, $NaCl$, $Na_2CO_3$, $Na_2CrO_4$, $HCOONa$, $NaHSO_4$, $NaOH$, $NaBO_2$, $Na_2O_3Si$, $NaVO_3$, $Na_2MoO_4$, $NaNO_3$, $NaOOC$-$COONa$, $NaMnO_4$, $Na_3PO_4$, $Na_2HPO_4$, $Na_2H_2P_2O_7$, $Na_4P_2O_7$, $Na_2SO_4$, and $Na_3P_3O_9$; salts of Ca include $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, and $CaSO_4$; and any combinations of these salts may be employed in the solution. In one variation, the metal salt may comprise Al and be selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

The first liquid precursor may also include one or more solvents. The solvent is non-limiting, and can be water, an alcohol, or other organic solute. In certain aspects, the solution is aqueous. The pH of the solution may be maintained by adding diluted acid. For example, in certain instances, the pH of the solvent may be maintained by adding diluted $HNO_3$.

In certain variations, the metal salt may have a molar concentration from greater than or equal to about 0.01M to less than or equal to about 10M in the first liquid precursor solution. The concentration of the metal salt may be dependent upon the catalyst metal loading requirements and the size of the support. Additionally, the metal salt may have a concentration of greater than or equal to about 1 wt. % to less than or equal to about 50 wt. % relative to the weight of the catalyst support after it is deposited.

Thus, the method comprises contacting a catalyst support (which may optionally include a catalytically active material and thus considered to be a catalyst) having a surface with a first liquid precursor solution comprising a metal salt, which may have an acidic pH. In this manner, the metal salt can be deposited, for example by precipitation or ion adsorption, onto the surface of the catalyst support. The metal salt may be selectively applied to form a porous coating of metal oxide on the surface of the catalyst support. The method thus includes precipitating or ion adsorption of the first liquid precursor on a portion of the surface of the catalyst support. Then, the precipitated or adsorbed species may be heated or calcined to form a first coating comprising a porous metal oxide on the surface. As noted below, the porous coating is believed to form on smaller pore sizes on the catalyst support surface, for example, having a pore size of less than or equal to about 50 nm. In certain aspects, the contacting of the surface of support (comprising the catalyst particle) with the solution includes submerging the surface in the first liquid precursor solution. The method may further include applying ultrasound to the solution to facilitate the precipitating and/or mixing the first liquid precursor solution with a planetary centrifugal mixer to facilitate the precipitating/mixing.

Precipitating or depositing the metal salts on the surface of the support may comprise agitating the catalyst support in a particulate form and the first liquid precursor solution comprising the metal salt, for example, by applying ultrasound for greater than or equal to about 5 minutes to facilitate precipitation. For example only, in some instances, the catalyst support particle and the first liquid precursor solution comprising the metal salt may be agitated by applying ultrasound for greater than or equal to about 15 minutes and in certain other variations, for about 30 minutes. In certain instances, the support particle and first liquid precursor solution may be mixed using a high speed planetary centrifugal mixing. For example, the support particle and first liquid precursor solution may be mixed using the high speed planetary centrifugal mixture for greater than or equal to about 5 minutes. In certain instances, the metal salt will hydrolyze and become negatively charged. The negatively charged metal salts may bind in a self-limiting manner to the exposed surface of the catalyst support. After a predetermined duration of time, the catalyst support particle may be removed from the first liquid precursor solution.

Applying the metal salts to the surface of the catalyst support may further comprise removing the solvent from the catalyst support having the first liquid precursor liquid disposed thereon, such as, for example, by evaporation or drying. In certain instances, evaporating or drying the solvent is performed by increasing the temperature or decreasing the pressure near the support particle in contact with the metal salt solution to facilitate precipitation of the metal salt on the surface of the support. In certain instances, drying is performed at a temperature of greater than or equal to about 50° C. For example only, drying may be performed at a temperature of about 80° C. Drying may be performed at a pressure of less than or equal to about 1 Torr. Drying may be performed for a time of greater than or equal to about 4 hours. For example only, drying may be performed for a time of about 6 hours. For example only, drying may occur in a vacuum oven where over a course of a hour the vacuum oven may be gradually heated to greater than or equal to about 80° C. at a pressure of 1 Torr. After warming, the vacuum oven may be keep at 80° C. for greater than or equal to about 6 hours. However, it is understood that other temperatures and durations may be used to remove solvent from support particles.

The method further comprises calcining the metal salts after precipitation or adsorption to generate a porous oxide coating on the support, where the metal oxide is derived from the metal salt. In certain aspects, the methods of the present disclosure selectively generate a porous coating of metal oxide on the surface of the support distributed around the active catalyst particle(s). The porous coating thus formed has a porosity, i.e., a volume of pores relative to the volume of coating, of greater than or equal to about 20% to less than or equal to about 70%, such as a porosity of about 20%, about 30%, about 40%, about 50%, about 60%, or about 70%.

The porous coating may be formed of a plurality of metal oxide nanoparticles having an average maximum diameter of greater than or equal to about 0.5 nm to less than or equal to about 50 nm, greater than or equal to about 1 nm to less than or equal to about 25 nm, or greater than or equal to about 2 nm to less than or equal to about 10 nm, such as a diameter of about 0.5 nm, about 1 nm, about 2 nm, about 3 nm, about 4 nm, about 5 nm, about 10 nm, about 15 nm, about 20 nm, about 25 nm, about 30 nm, about 35 nm, about 40 nm, about 45 nm, or about 50 nm. The porous coating comprising the metal oxide nanoparticles may be crystalline.

Calcining includes heating the catalyst support and metal salts at a temperature of greater than or equal to about 300° C. to less than or equal to about 600° C., such as at a temperature of about 550° C., for a time of greater than or equal to about 2 hours to generate a porous coating of metal oxide nanoparticles on the support. In various aspects, the temperature applied during calcining is less than the melting point of the metal oxide derived from the metal salt. Non-limiting examples of metal oxides formed from metal salts include $Al_2O_3$, $CeO_2$, $ZrO_2$, $TiO_2$, $SiO_2$, MgO, ZnO, BaO, $K_2O$, $Na_2O$, CaO, and combinations thereof. Thus, a first coating that comprises such a metal oxide is formed on at least a portion of the surface of the catalyst support.

The method also comprises contacting a surface of a catalyst support in a particulate form with a second liquid precursor. The second liquid precursor may comprise a sol of a metal oxide. A colloidal sol can be used to form a porous metal oxide layer or coating. A colloidal solution (sol) serves as a precursor for an integrated network (or gel) of discrete particles or network polymers. Typical precursors can include metal alkoxides or metal oxides. For example, the sol may comprise a metal oxide comprising a metal selected from the group consisting of: aluminum (Al), cerium (Ce), zirconium (Zr), iron (Fe), titanium (Ti), silicon (Si), and combinations thereof. A suitable aluminum-containing sol may be an aluminum hydroxide oxide (AlO(OH)) or bohemite aluminum oxide $Al_2O_3$. Other oxide sols may include those that form cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

The second liquid precursor may comprise the solvents discussed above in the context of the first liquid precursor, including water, an alcohol, or other organic solute. In certain aspects, the second liquid precursor is aqueous. The pH of the solution may be maintained by adding diluted acid. For example, in certain instances, the pH of the solvent may be maintained by adding diluted $HNO_3$. In one variation, the second liquid precursor comprises the aluminum oxide or alumina ($Al_2O_3$) sol. In one variation, the second liquid precursor comprises aluminum hydroxide oxide (AlO(OH)), nitric oxide, and water.

In certain variations, the metal sol may have a molar concentration from greater than or equal to about 0.1M to less than or equal to about 10M in the second liquid precursor solution. The concentration of the metal oxide sol may be dependent upon the catalyst metal loading requirements and the size of the support. In one variation, the metal oxide sol may have a concentration of greater than or equal to about 15 wt. % to less than or equal to about 50 wt. %, optionally greater than or equal to about 15 wt. % to less than or equal to about 30 wt. %. Additionally, the metal sol may have a concentration of greater than or equal to about 1 wt. % to less than or equal to about 50 wt. % relative to the weight of the catalyst support after it is deposited.

In certain aspects, the catalyst or catalyst support in particulate form may be introduced into the second liquid precursor.

A second coating comprising an oxide layer (e.g., metal oxide) is thus formed from the second liquid precursor on a portion of the surface of the catalyst support. As noted above, the sol contains metal oxides, such as aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

By such a method, the catalyst comprises a dual or hybrid coating system including the first coating and the second coating to form the sinter-resistant catalyst system, as will be discussed further below in the context of FIG. 6. While not limiting the present disclosure to any particular theory, it is believed that the first coating of the metal oxide formed on the surface of the catalyst is formed within the micropores and mesopores (having an average pore size of less than or equal to about 50 nm) of the catalyst support and thus surrounds the catalyst metal. The catalyst metal typically occupies active sites on the catalyst support corresponding to mesopores having an average pore size diameter of about 2-50 nm. The catalyst support is often an agglomerate of clusters and thus defines macropores (having a pore size of greater than about 50 nanometers (nm) diameter) including large volumes between clusters. The sol is believed to form an oxide layer or coating that fills in a portion of the macropores of the catalyst support, thus providing a dual coating system. As will be appreciated by those of skill in the art, the first coating and the second coating may be selectively deposited on discrete regions of the catalyst surface and thus each may be a discontinuous coating or layer.

In certain aspects, the surface of the catalyst support may comprise at least one bound catalyst particle disposed thereon prior to the contacting of the surface with the first liquid precursor. In other aspects, the catalyst particle may be bound to the surface of the catalyst support concurrently with the reaction of the first liquid precursor and/or the second liquid precursor.

The method may include binding at least one active catalyst material to a catalyst support. The catalyst may be a nanoparticle. The active catalyst optionally comprises one or more platinum group metals (PGM), noble group metals, or the like. For example, the catalyst may comprise one or more platinum group metals, such as ruthenium (Ru), rhodium (Rh), palladium (Pd), osmium (Os), iridium (Ir), platinum (Pt), or combinations thereof; other metals, such as copper (Cu), silver (Ag), gold (Au), iron (Fe), nickel (Ni), manganese (Mn), sodium (Na), potassium (K), magnesium (Mg), calcium (Ca), barium (Ba), or combinations thereof.

For example, the catalyst particle optionally comprises a metal selected from the group consisting of: platinum (Pt), ruthenium (Ru), rhodium (Rh), palladium (Pd), osmium (Os) nanoparticle, iridium (Ir), gold (Au), iron (Fe), nickel (Ni), manganese (Mn), and combinations thereof. In one variation, the catalyst particle may comprise platinum (Pt), palladium (Pd), rhodium (Rh), or mixtures thereof. In another variation, the catalyst particle may comprise platinum (Pt), palladium (Pd), or mixtures thereof.

The catalyst particle may have a maximum diameter of greater than or equal to about 0.5 nm to less than or equal to about 10 nm, such as a diameter of about 2 nm, about 3 nm, about 4 nm, about 5 nm, about 6 nm, about 7 nm, about 8 nm, about 9 nm, or about 10 nm.

After binding a catalyst particle to a catalyst support, also referred to herein as a "supported particle," the supported catalyst particle may be washed with an acidic solution, especially if the supported particle is to be further treated by the methods of the present disclosure. Washing may improve the uniformity of the catalyst particle size where a plurality of catalyst particles is disposed on the catalyst support surface. In certain aspects, the solution is aqueous. The acidic solution may comprise acetic acid ($CH_3COOH$), nitric acid ($HNO_3$), and/or citric acid ($C_6H_8O_7$), by way of non-limiting example.

In certain aspects, the present disclosure further contemplates the following methods. The sinter-resistant catalyst system may be applied as a washcoat layer over a monolith substrate/catalyst support. In certain variations, the sinter-resistant catalyst system may be dried and then subsequently redistributed in a washcoat slurry comprising water and optional binders, such as metal oxide sols that can form a metal oxide binder. The washcoat layer may include the same or different metal oxides to form a porous ceramic layer including the catalyst material. The washcoat precursor including the sinter-resistant catalyst material(s) can be applied to a surface of the catalyst support and then heat treated, e.g., calcined to form a porous ceramic washcoat layer including the catalyst material dispersed therein.

In certain aspects, the contacting of the surface of the catalyst support with a first liquid precursor and the contacting of the surface with the second liquid precursor occur concurrently. For example, in process 20 shown in FIG. 1, a first liquid precursor 30, a second liquid precursor 32, and a plurality of catalyst support particles 34 (having catalyst particles (not shown) disposed on a support surface thereof) are combined together at 40 into a single vessel 42. The first liquid precursor 30 includes any of the metal salts described previously above. The second liquid precursor 32 includes any of the metal oxide sols as described above. Thus, a liquid medium 44 includes a combination of the first liquid precursor 30 and second liquid precursor 32 with the catalyst support particles 34. In this manner, first liquid precursor 30 can precipitate or adsorb on at least a portion of the surface of the catalyst support particles 34 to form a first coating (not shown) comprising a porous metal oxide on the surface, while concurrently a second coating (not shown) comprising a sol is formed on at least a portion of the surface of the catalyst particles 34 from the second liquid precursor 32. Notably, the coatings may be formed over one another or on adjacent and distinct regions of the surface of the catalyst support. The second coating comprising a metal oxide may be formed over the first coating comprising the porous oxide on the surface of the catalyst support or the first coating comprising the porous oxide may be formed over the second coating comprising a sol metal oxide. Further, each coating may be discontinuous and applied to select surface regions of the catalyst surface. In certain aspects, it is believed that the first coating may occupy select regions corresponding to smaller pores on the catalyst support around the catalyst particles, while the second coating occupies larger pores of the catalyst support.

In certain aspects, the method further comprises filtering the catalyst in the particulate form from a liquid, drying the catalyst, and calcining the catalyst. As shown at 50, the coated catalyst particles may be filtered from the liquid medium 44, dried, and then calcined to form the sinter-resistant catalyst particles 52. In certain variations, the calcining may include heating the catalyst and the metal oxide disposed on the surface to greater than or equal to about 300° C. to less than or equal to about 600° C. for greater than or equal to about 2 hours. Other suitable drying and calcining conditions were also described previously above. At 60, the sinter-resistant catalyst particles 52 may optionally be introduced into a washcoat slurry 62. The sinter-resistant catalyst particles 52 can be combined with water and/or other solvents, as well as with other conventional washcoat ingredients like binders in the slurry 62. The slurry 62 may be applied at 70 to various surfaces of a monolith substrate 72 to form a washcoat layer thereon and may be calcined or further treated in a typical washcoat formation process. The calcining may be done at the temperatures described previously above for calcining the metal salts.

Figure 2:
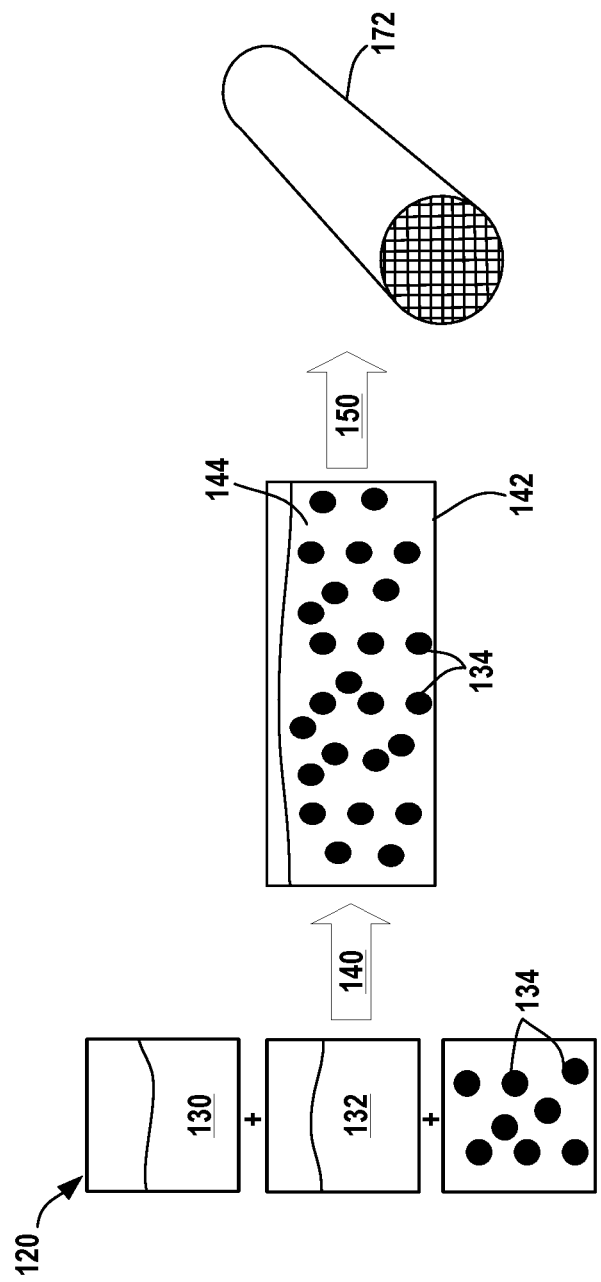
FIG. 2 is a schematic illustrating another method of forming a dual coating for a catalyst system according to certain aspects of the present technology.

Another method according to certain aspects of the present disclosure is shown in FIG. 2. The process 120 includes combining a first liquid precursor 130, a second liquid precursor 132, and a plurality of catalyst support particles 134 (having active catalyst particles disposed on a surface thereof) together at 140 into a single vessel 142. The first liquid precursor 130 includes any of the metal salts described previously above. The second liquid precursor 132 includes any of the sols as described above. Thus, a liquid medium 144 includes the combination of the first liquid precursor 130 and second liquid precursor 132 along with the catalyst support particles 134.

In this manner, first liquid precursor 130 can precipitate or adsorb on a portion of the surface of the catalyst support particles 134 to form a first coating (not shown) comprising a porous metal oxide, while concurrently a second coating (not shown) formed on at least a portion of the surfaces of the catalyst particles 134 from the second liquid precursor 132. As shown at 150, the liquid medium 144 including the catalyst particles 134 is used directly as a washcoat slurry to coat one or more surfaces of a monolith substrate 172. Other conventional washcoat ingredients like binders can be introduced into the liquid medium 144 prior to washcoating the surfaces of the monolith substrate 172. The washcoat layer is formed thereon and may be dried and calcined as described previously above. The washcoat layer thus comprises the sinter-resistant catalyst particles having the first coating and second coating, which are directly applied to a monolith substrate, omitting the independent steps of filtration, drying, and calcination in FIG. 1.

Figure 3:
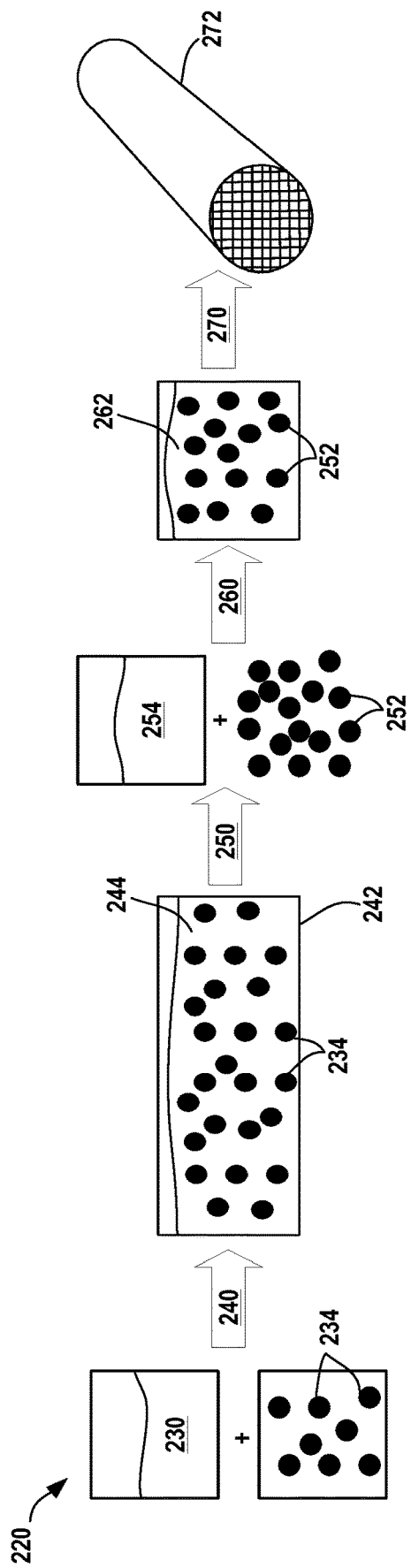
FIG. 3 is a schematic illustrating a method of forming a dual coating for a catalyst system according to yet other aspects of the present technology.

In another variation, a process 220 is shown in FIG. 3, where the contacting of a surface of a catalyst support with a first liquid precursor occurs prior to the contacting of the surface with the second liquid precursor. Thus, in process 220, a first liquid precursor 230 and a plurality of catalyst support particles 234 (having active catalyst particles disposed on a surface thereof) are combined together at 240 into a single vessel 242. The first liquid precursor 230 includes any of the metal salts described previously above. Thus, a liquid medium 244 includes the combination of the first liquid precursor 230 and the catalyst support particles 234. In this manner, first liquid precursor 230 can precipitate or adsorb on a portion of the surface of the catalyst support particles 234 to form a first coating (not shown) comprising a porous metal oxide on the surface.

As shown at 250, the coated catalyst particles may be filtered from the liquid medium 244, dried, and then calcined to form partially coated catalyst particles 252. The partially coated catalyst particles 252 may then be combined with a second liquid precursor 254 at step 260 to form a washcoat slurry 262. The second liquid precursor 254 includes any of the sols as described above. The catalyst particles 252 and second liquid precursor 254 can also be combined with water and/or other solvents, as well as with other conventional washcoat ingredients like binders in the slurry 262. The slurry 262 may be applied at 270 to various surfaces of a monolith substrate 272 to form a washcoat layer thereon and may be dried, calcined, and/or further treated in a typical washcoat formation process. As the slurry 262 is applied, a second coating (not shown) is formed on the catalyst particles 252 from the second liquid precursor 254 to form sinter-resistant catalyst particles. The drying and calcining may be done at the temperatures described previously above. In such a variation, the oxide layer can serve as a coating on the surfaces of the catalyst support particles, as well as a binder for the washcoat layer.

Figure 4:
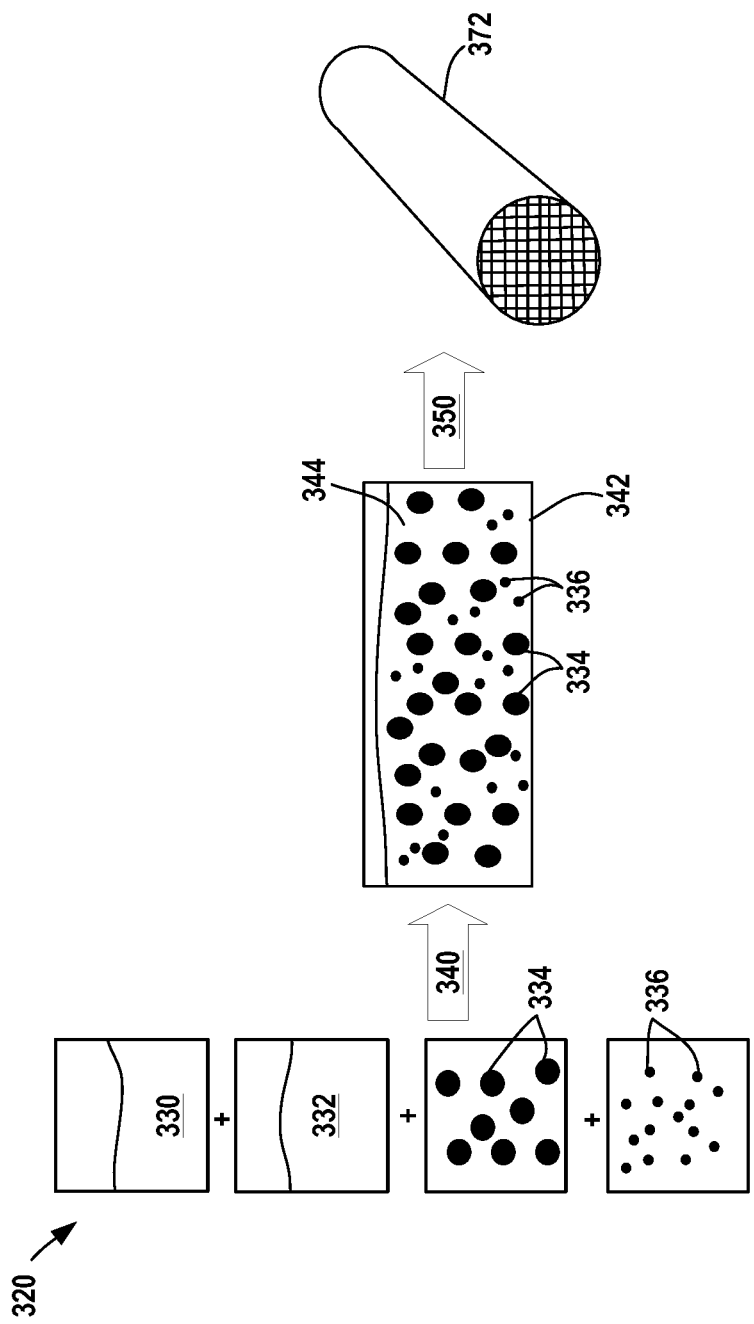
FIG. 4 is a schematic illustrating a method of a dual coating for a catalyst system according to certain aspects of the present technology.

The methods according to certain aspects of the present disclosure may also further comprise contacting a surface of a catalyst with at least one catalyst particle concurrently with the contacting of the first liquid precursor and the second liquid precursor with the surface of the catalyst support. FIG. 4 shows such a process 320. The process 320 includes combining a first liquid precursor 330, a second liquid precursor 332, a plurality of catalyst support particles 334, and a plurality of precursors of catalyst particles 336 together at 340 into a single vessel 342. The first liquid precursor 330 includes any of the metal salts described previously above. The second liquid precursor 332 includes any of the sols as described above. The precursors of catalyst particles 336 may include precursors to any of the catalysts described above, as are known in the art. Thus, a liquid medium 344 includes the combination of the first liquid precursor 330, second liquid precursor 332, catalyst support particles 334, and the precursors of catalyst particles 336. In this manner, the plurality of catalyst particles 336 are disposed on a surface of the catalyst support particles 334, while the first liquid precursor 330 can precipitate or adsorb on a portion of the surface of the catalyst support particles 334 to form a first coating (not shown) comprising a porous metal oxide on the surface and concurrently a second coating (not shown) formed on a portion of the surfaces of the catalyst support particles 334 from the second liquid precursor 332.

As shown at 350, the liquid medium 344 is used directly as a washcoat slurry to coat one or more surfaces of a monolith substrate 372. Other conventional washcoat ingredients like binders can be introduced into the liquid medium 344 prior to washcoating the surfaces of the monolith substrate 372. The washcoat layer is formed thereon and may be dried and calcined, at the conditions described previously above. In this manner, the sinter-resistant catalyst particles have a surface that includes the catalyst particles, the first coating and the second coating, which are directly applied to a monolith substrate, omitting the intermediate steps of filtration, drying, and calcination in FIG. 1.

Figure 5:
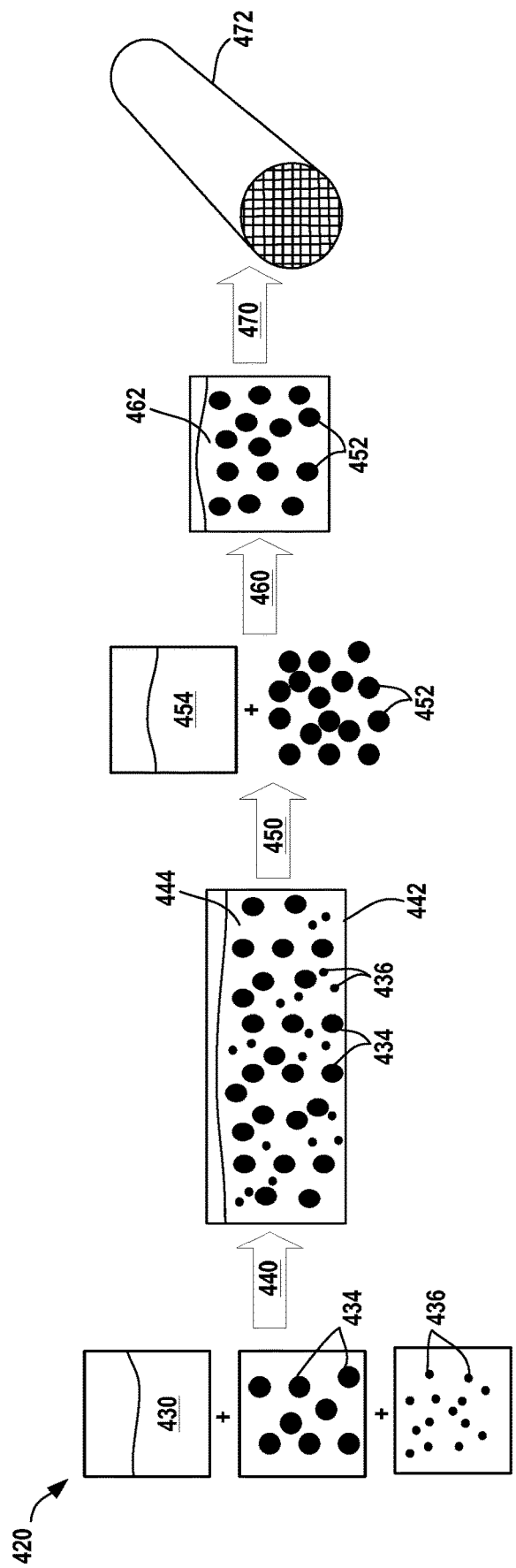
FIG. 5 is a schematic illustrating yet another method of forming a dual coating for a catalyst system according to certain aspects of the present technology.

In another variation, a process 420 is shown in FIG. 5, where the contacting of a surface of a catalyst support with a first liquid precursor occurs prior to the contacting of the surface with the second liquid precursor. Further, catalyst particles are combined with the first liquid precursor and catalyst support particles in an initial step. Thus, in process 420, a first liquid precursor 430, a plurality of catalyst support particles 434, and a plurality of precursors of catalyst particles 436 are combined together at 440 into a single vessel 442. The first liquid precursor 430 includes any of the metal salts described previously above. The precursors of catalyst particles 436 may include precursors to any of the catalysts described above, as are known in the art. Thus, a liquid medium 444 includes the combination of the first liquid precursor 430, catalyst support particles 434, and the precursors of catalyst particles 436. In this manner, the catalyst particles 436 are bound to the surface of the catalyst support particles 434, while the first liquid precursor 430 can precipitate on a portion of the surface of the catalyst support particles 434 to form a first coating (not shown) comprising a porous metal oxide on the surface.

As shown at 450, the coated catalyst particles may be filtered from the liquid medium 444, dried, and then calcined to form partially coated particles 452 (including the catalyst particles disposed on the surface of the catalyst support particles). The partially coated particles 452 may then be combined with a second liquid precursor 454 at step 460 to form a washcoat slurry 462. The second liquid precursor 454 includes any of the sols as described above. The particles 452 and second liquid precursor 454 can also be combined with water and/or other solvents, as well as with other conventional washcoat ingredients like binders in the slurry 462. The slurry 462 may be applied at 470 to various surfaces of a monolith substrate 472 to form a washcoat layer thereon, which can be dried, calcined, and/or further treated in a typical washcoat formation process. As the slurry 462 is applied, a second coating (not shown) comprising a metal oxide (e.g., a porous metal oxide) is formed on the partially coated particles 452 from the second liquid precursor 454 to form sinter-resistant catalyst particles. The drying and calcining may be done at the temperatures described previously above.

In certain aspects, prior to the contacting of the surface of the catalyst support with a first liquid precursor, the catalyst support may be pretreated. Such pretreatment may include stabilizing a catalyst system by hydrothermally treating an aluminum oxide support comprising $\gamma$-$Al_2O_3$ phase by heating the support to a temperature of greater than or equal to about 700° C. to less than or equal to about 1,200° C. in the presence of water in air. Prior to any pretreatment, the as-received catalyst support material may comprise $\gamma$-$Al_2O_3$ phase. For example, the aluminum oxide catalyst support may comprise greater than or equal to about 75 volume % of $\gamma$-$Al_2O_3$ phase, optionally greater than or equal to about 80 volume % of $\gamma$-$Al_2O_3$ phase, optionally greater than or equal to about 85 volume % of $\gamma$-$Al_2O_3$ phase, optionally greater than or equal to about 90 volume % of $\gamma$-$Al_2O_3$ phase, optionally greater than or equal to about 95 volume % of $\gamma$-$Al_2O_3$ phase, optionally greater than or equal to about 97 volume % of $\gamma$-$Al_2O_3$ phase, and in certain variations, optionally greater than or equal to about 98 volume % of $\gamma$-$Al_2O_3$ phase. The $\gamma$-$Al_2O_3$ phase can be unstable when exposed to catalyst operating temperatures over time, thus suffering from aging, collapse, and deactivation.

In certain aspects, the aluminum oxide catalyst support comprising the $\gamma$-$Al_2O_3$ phase is heated to a temperature of greater than or equal to about 700° C. to less than or equal to about 1,200° C., optionally greater than or equal to about 850° C. and less than or equal to about 1,100° C. The heating may be part of a hydrothermal treatment process that occurs in the presence of water. The heating step may be conducted for greater than or equal to about 10 hours and in certain variations, optionally greater than or to about 15 hours, optionally greater than or to about 20 hours, and in certain variations, optionally greater than or to about 24 hours.

The heating step converts a majority of the γ-$Al_2O_3$ to a more stable alumina phase. A majority means greater than or equal to about 50% by volume, optionally greater than or equal to about 60% by volume, optionally greater than or equal to about 70% by volume, optionally greater than or equal to about 75% by volume, optionally greater than or equal to about 80% by volume, optionally greater than or equal to about 85% by volume, optionally greater than or equal to about 90% by volume, optionally greater than or equal to about 95% by volume, optionally greater than or equal to about 97% by volume, optionally greater than or equal to about 98% by volume, and in certain variations, optionally greater than or equal to about 99% by volume of the γ-$Al_2O_3$ is converted to a stable alumina phase. The stable alumina phase may be selected from the group consisting of: θ-$Al_2O_3$, δ-$Al_2O_3$, and combinations thereof.

The method may optionally further include converting a majority of the γ-$Al_2O_3$ to a stable alumina phase selected from the group consisting of: θ-$Al_2O_3$, δ-$Al_2O_3$, and combinations thereof to form a stabilized porous aluminum oxide support having an average surface area of greater than or equal to about 50 $m^2$/g to less than or equal to about 150 $m^2$/g. After the hydrothermal treatment, a catalytically active particle may be bound with the surface of the catalyst support. Thus, a platinum group metal active compound/catalyst is bound with a surface of the stabilized porous aluminum oxide support to form the catalyst.

In other aspects, the catalyst support may be pretreated in a reducing atmosphere to promote conversion of the metal(s) in the catalyst particle to a metallic state prior to contact with the first liquid precursor. In one variation, the supported particle may be disposed in a reducing atmosphere while placed in a furnace or other vessel that may be sealed and heated. The furnace may be purged with a reducing atmosphere. For example, the furnace may be purged with a gas mixture comprising an inert gas and hydrogen ($H_2$). The gas mixture may comprise less than or equal to about 3% by volume hydrogen ($H_2$) with a balance being the inert gas. For example, the inert gas may be argon (Ar), nitrogen ($N_2$), or other inert gases. In one variation, the gas mixture may comprise argon (Ar) having less than or equal to about 3% by volume hydrogen ($H_2$). Such purging may occur for greater than or equal to about 30 minutes. For example only, in certain instances, the purging may occur for about 1 hour. A flow rate of the gas used for purging may be greater than or equal to about 1 standard cubic feet per hour (SCFH).

In certain variations, the present disclosure contemplates a method of preparing a sinter-resistant catalyst system. Such a method may include contacting a surface of a catalyst support in a particulate form with a first liquid precursor. The first liquid precursor may include a metal salt comprising an element selected from the group consisting of: aluminum (Al), cerium (Ce), zirconium (Zr), titanium (Ti), silicon (Si), magnesium (Mg), zinc (Zn), and combinations thereof. The first liquid precursor is precipitated or ion-adsorbed on a portion of the surface of the catalyst support and calcined to form a first coating comprising a porous metal oxide on the surface. The method also includes contacting the surface with a second liquid precursor comprising a sol comprising a metal oxide selected from the group consisting of: aluminum (Al), cerium (Ce), zirconium (Zr), iron (Fe), titanium (Ti), silicon (Si), and combinations thereof. A second coating is formed from the second liquid precursor that comprises a sol on a portion of the surface of the catalyst support, so that the surface of the catalyst support comprises the first coating and the second coating to create the sinter-resistant catalyst system. The sol-gel may be the metal oxide sol-gel described previously above.

In other aspects, the method includes applying the sinter-resistant catalyst system as a washcoat layer over a monolith substrate.

In certain aspects, the surface of the catalyst support comprises at least one bound catalyst particle disposed thereon prior to the contacting of the surface with the first liquid precursor.

In other aspects, the catalyst particle comprises a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof.

The contacting of the surface of the catalyst support with a first liquid precursor and the contacting of the surface with the second liquid precursor may occur concurrently.

In certain aspects, after the contacting of the surface of the catalyst support with the second liquid precursor, the method further comprises filtering the catalyst support in the particulate form from a liquid, drying, and then conducting the calcining.

In other aspects, the contacting of the surface of the catalyst support with at least one catalyst particle occurs concurrently to the contacting with the first liquid precursor and the second liquid precursor.

The catalyst support may be optionally dispersed in a liquid medium comprising the first liquid precursor and the second liquid precursor to form a slurry. The slurry may then be applied as a washcoat layer over a monolith substrate.

In certain variations, the contacting of the surface of the catalyst support with a first liquid precursor occurs prior to the contacting of the surface with the second liquid precursor. After the contacting of the surface of the catalyst support with a first liquid precursor, such a method may include filtering the catalyst support in the particulate form from a liquid, drying, conducting the calcining, and then contacting of the surface with the second liquid precursor.

The calcining optionally comprises heating the catalyst support and the metal oxide disposed on the surface to greater than or equal to about 300° C. to less than or equal to about 600° C. for greater than or equal to about 2 hours.

In certain variations, the catalyst support comprises a metal oxide selected from the group consisting of: aluminum oxide ($Al_2O_3$), cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In certain variations, the metal salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

In certain aspects, prior to the contacting of the surface of the catalyst support with a first liquid precursor, the method further comprises pretreating the catalyst support by hydrothermally treating the catalyst support to a temperature of greater than or equal to about 800° C. to less than or equal to about 1,200° C. in the presence of water and air; and binding a catalyst particle with the surface of the catalyst support.

In certain other variations, the present disclosure contemplates a method of preparing a sinter-resistant catalyst system. The method may include contacting a surface of a catalyst in a particulate form with a first liquid precursor including an aluminum (Al) salt. The catalyst includes a catalyst support and an active catalyst material. The method may include precipitating or ion-adsorbing the first liquid precursor on a portion of the surface of the catalyst and calcining to form a first coating including a porous aluminum oxide on the surface. The surface is then contacted with a second liquid precursor including an aluminum-containing sol, such as an alumina ($Al_2O_3$) sol. Then, a second coating is formed that includes a porous alumina on a portion of the surface of the catalyst support created from the second liquid precursor. The surface of the catalyst includes the first coating and the second coating to create the sinter-resistant catalyst system. In this manner, the first coating and the second coating trap a mobile active catalyst material species on the surface of the catalyst.

In certain aspects, the aluminum (Al) salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

In certain aspects, the aluminum-containing sol comprises aluminum hydroxide oxide (AlO(OH)) or bohemite phase aluminum oxide ($Al_2O_3$).

In one variation, the aluminum (Al) salt optionally comprises aluminum nitrate ($Al(NO_3)_3$) and the second liquid precursor comprises aluminum hydroxide oxide (AlO(OH)), nitric oxide, and water.

In one aspect, the active catalyst material may include a platinum group metal selected from the group consisting of: platinum (Pt), ruthenium (Ru), rhodium (Rh), palladium (Pd), osmium (Os), iridium (Ir), gold (Au), and combinations thereof.

In certain aspects, the methods of the present disclosure may be conducted as follows. A powder of $Al_2O_3$ (alumina) catalyst support nanoparticles comprising bound PGM nanoparticles (e.g., Pt, Pd, or a combination thereof) is contacted with an aqueous solution. A controlled amount of a coating precursor (e.g., $Al^{3+}$, mol ratio of Al/PGM of about 5/1) and alumina sol (10 wt. % of PGM/alumina catalyst) are added to the aqueous solution including the supported nanoparticles comprising PGM nanoparticles bound to an alumina support. The solution has a pH less than 7. The coating precursors form negatively charged coating radicals. The surface of the catalyst support is positively charged. The mixture is fully stirred or milled at a temperature greater than 0° C. and less than or equal to 80° C. for a period greater or equal to a few minutes and less than or equal to a few days. The mixture is then filtrated and dried in ambient air or a vacuum at a temperature greater than or equal to room temperature to less than or equal to 100° C. for a time period greater than or equal to a few minutes to less than or equal to three days. The dry powder is then calcined at a temperature of greater than or equal to about 300° C. to less than or equal to about 600° C. for a time of greater than or equal to about 2 hours to less than or equal to about 10 hours to generate the metal oxide coating.

Figure 6:
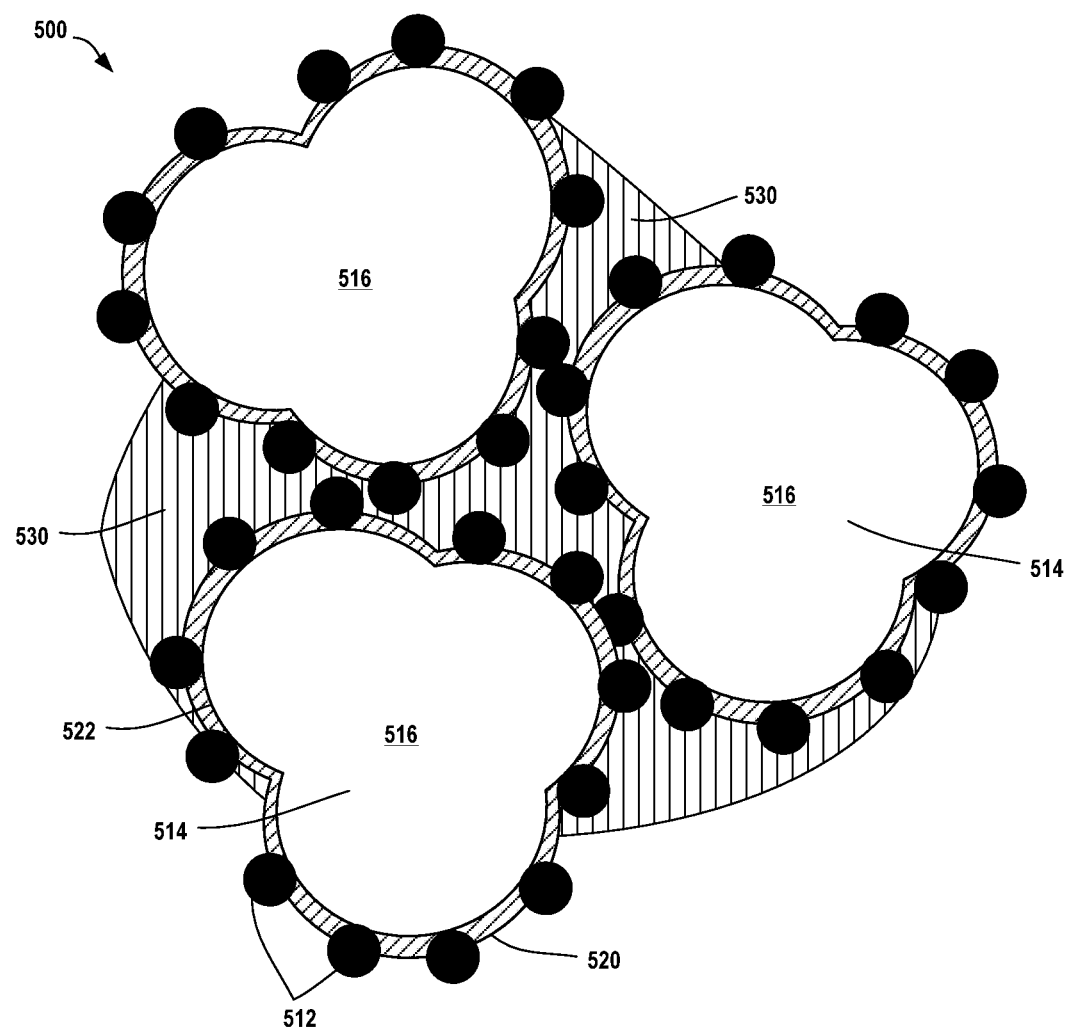
FIG. 6 is an illustration of a sinter-resistant catalyst system having a dual coating prepared according to certain aspects of the present technology.

With reference to FIG. 6, the current technology provides a catalyst system 500 that resists sintering and retains catalytic activity after prolonged exposures to elevated temperatures. The catalyst system 500 can be a catalyst system generated by the methods previously described above. The catalyst system 500 includes metal nanoparticles 512 (catalyst) bound to a catalyst metal oxide catalyst support 514 in the form of an agglomerated particle. FIG. 6 is a representative cross-section through such an agglomerated support particle having a plurality of grains or clusters 516 bound to one another. It should be noted the catalyst metal oxide catalyst support 514 may have shapes or forms other than that shown, which is merely provided for purposes of illustration.

In certain instances, the catalyst metal nanoparticles 512 are either directly or indirectly coupled or bound to the metal oxide catalyst support 514. A first coating 520 is a porous metal oxide coating that may be formed of distinct metal oxide nanoparticles disposed on the metal oxide catalyst support 514. The first coating 520 may be intermittently and selectively disposed on a surface 522 of the metal oxide catalyst support 514 distributed around the catalyst metal nanoparticles 512. In this manner, the first coating 520 leaves at least a portion of the surface(s) of the catalyst metal nanoparticles 512 exposed so that the active metal sites are available for reaction, but serves as a "wall" to separate adjacent catalyst metal nanoparticles 512. In this manner, in certain aspects, the first coating 520 avoids covering the catalyst metal nanoparticles 512 or at least partially avoids covering the catalyst metal nanoparticles 512.

The catalyst particles (e.g., metal nanoparticles 12) may have a loading density on the catalyst support 514 of greater than or equal to about 0.25% (w/w) to less than or equal to about 30% (w/w), greater than or equal to about 0.5% (w/w) to less than or equal to about 20% (w/w), greater than or equal to about 1% (w/w) to less than or equal to about 15% (w/w), such as a loading density of about 0.25% (w/w), about 0.5% (w/w), about 1% (w/w), about 1.5% (w/w), about 2% (w/w), about 2.5% (w/w), about 3% (w/w), about 3.5% (w/w), about 4% (w/w), about 4.5% (w/w), about 5% (w/w), about 5.5% (w/w), about 6% (w/w), about 6.5% (w/w), about 7% (w/w), about 7.5% (w/w), about 8% (w/w), about 8.5% (w/w), about 9% (w/w), about 9.5% (w/w), about 10% (w/w), about 15% (w/w), about 20% (w/w), about 25% (w/w), or about 30% (w/w). In certain instances, the loading density of the metal nanoparticles 512 on the metal oxide catalyst support 514 is about 1.5% (w/w).

As described above in regard to the method of preparing a catalyst, the nanoparticles 512 may comprise PGM nanoparticles or other metals like those described above, such as nanoparticles of Ru, Rh, Pd, Os, Ir, and/or Pt, by way of non-limiting example.

As discussed above, the metal oxide catalyst support 514 optionally comprises a metal oxide selected from the group consisting of $Al_2O_3$, $CeO_2$, $La_2O_3$, $ZrO_2$, $TiO_2$ $SiO_2$, MgO, ZnO, BaO, $K_2O$, $Na_2O$, CaO, and combinations thereof. Nonetheless, it is understood that this group of metal oxides is not limited and that other metal oxides may be employed for the support 14.

A second coating 530 is also formed over at least a portion of the surface 522 of the metal oxide catalyst support 514. The second coating comprises a metal oxide layer.

Thus, in various aspects, the present disclosure provides highly active and stable catalyst systems that include a dual coating system that includes creating a first coating 520 that is a nanoscale material that physically separates catalyst particles 512 (e.g., platinum group metal (PGM) particles) on the surface 522 of the catalyst support 514, as well as a second coating 530 that comprises a metal oxide layer surrounding the primary catalyst particles 512 and grains or clusters 516 in the catalyst support 514, thus suppressing aging caused by sintering and vaporization. Such a dual or hybrid coating system serves to minimize or suppress the two main PGM catalyst particle growth pathways by creating metal oxide (like aluminum oxide) wall as a coating around each individual PGM catalyst particle; and also a metal oxide sol-gel layer surrounding primary PGM catalyst/alumina grains.

As discussed above, while not being bound by any particular theory, it is believed that the first coating 520 of the precipitated metal oxide formed on the surface 522 of the catalyst support 514 is formed within the micropores and mesopores (having an average pore size of less than or equal to about 50 nm) of the catalyst support 514 and thus surrounds the catalyst metal particles 512. The catalyst metal particles 512 typically occupy active sites on the catalyst support 514 corresponding to mesopores having an average pore size diameter of about 2-50 nm. As discussed above, the catalyst support 514 is often an agglomerate of grains or clusters 516 and thus defines macropores (having a pore size of greater than about 50 nanometers (nm) diameter) including large volumes between clusters 516. The second coating 530 comprising a layer of porous metal oxide is believed to fill in a portion of the macropores of the catalyst support 514, thus providing a dual coating system. In this manner, the sinter-resistant catalyst system provides enhanced stability by trapping the mobile platinum group metal (PGM) catalyst species and preventing/minimizing catalyst mobility and sintering processes.

The first coating 520 and second coating 530 may be formed over one another (as generally shown in FIG. 6) or on adjacent and distinct regions of the surface 522 of the catalyst support 514, for example, formed adjacent to one another by occupying pores of different sizes within the catalyst support 514. The second coating 530 may be formed over the first coating 520 on the surface 522 of the catalyst support 514 or alternatively the first coating 520 may be formed over the second coating 530, depending on the methods that are employed to form the hybrid sinter-resistant coating system.

The first coating 520 may comprise greater than about 0.1% by weight to less than or equal to about 30% by weight of the total catalyst system weight (including the catalyst metal oxide catalyst support 514, the metal nanoparticles 512, and the first and second coatings 520 and 530), while the second coating 530 may likewise comprise greater than about 0.1% by weight to less than or equal to about 20% by weight of the total catalyst system weight. Each of the first coating 520 and the second coating 530 may comprise a single layer or multiple layers, if the deposition steps are repeated, for example.

The first and second coatings 520 and 530 may cover a large area of otherwise exposed surface area of the catalyst support surface. In various embodiments, the first and second coatings 520 and 530 coating may collectively cover greater than or equal to about 1.5% to less than or equal to about 90% of the exposed surface area of the catalyst support, or greater than or equal to about 30% to less than or equal to about 80% of the exposed regions of the surface of the catalyst support 514. The exposed surfaces of the catalyst support 514 refer to the portions of the catalyst support surface 522 to which catalyst metal particles 512 are not bound. In various embodiments, the first and second coatings 520 and 530 cover about 40%, about 50%, about 60%, about 70%, or about 80% or more of the exposed surface area of the catalyst support. A total amount of surface area coverage of the support including both the catalyst metal particles and metal oxide nanoparticles (forming the coatings) is greater than or equal to about 10% to less than or equal to about 80%.

The first coating 520 and/or second coating 530 may comprise a plurality of pores such that reacting gas molecules can access the catalyst metal nanoparticles 512 having catalytic activity, yet coalescing of metal nanoparticles 512 with other the metal nanoparticles is minimized or prevented. Therefore, the dual coating system including the first coating 520 and the second coating 530 may render the catalyst system 500 resistant to sintering or thermal degradation by increasing the surface area of the catalyst system 500. In particular, increasing the number of available surface sites of the catalyst system 500 can be expressed as catalytic metal dispersion.

"Catalyst metal dispersion" refers to a ratio of surface metal catalyst sites to a total number of the metal of an entire catalyst system. Therefore, a catalyst system with a high dispersion will have smaller and more highly dispersed metal relative to a catalyst system with a low dispersion.

In certain aspects, the hybrid coating system of the present technology may be deposited and inhibit sintering in part by physical separation of adjacent catalyst metal nanoparticles. For example, relative to a conventional catalyst system having the same catalyst and support material, but lacking the porous coating, the present technology may reduce a catalyst metal loading requirement by greater than or equal to about 30%, greater than or equal to about 40%, greater than or equal to about 50%, greater than or equal to about 60%, greater than or equal to about 70%, greater than or equal to about 80% or great than or equal to about 90%, such as from about 30% to about 90%, from about 40% to about 80%, from about 50%, to about 80%, from about 60% to about 80%, or from about 70% to about 80%. In other aspects, relative to a conventional catalyst system having the same catalyst and support material, but lacking the hybrid coating system, the present technology may reduce a lightoff temperature by greater than or equal to about 10° C., optionally greater than or equal to about 20° C., and in certain variations, optionally reduce a lightoff temperature from greater than or equal to about 30° C.

Embodiments of the present technology are further illustrated through the following non-limiting examples.

Example 1

In Example 1, lightoff temperatures for palladium catalyst systems are compared. A control 620 is formed from an aluminum oxide (alumina-$Al_2O_3$) powder having a plurality of platinum (Pd) nanoparticles bound on the surface thereof at a concentration of 1.5 weight % Pd.

A first sample 622 is prepared to include a first coating over an aluminum oxide (alumina-$Al_2O_3$) catalyst support powder. A plurality of palladium (Pd) nanoparticles is bound to the surface of the $Al_2O_3$ at a concentration of 1.5 weight % Pd. The support particles (with the catalyst nanoparticles) are added to an aqueous solution comprising a controlled amount of a first coating precursor comprising aluminum nitrate ($Al(NO_3)_3$)(e.g., $Al^{3+}$, mol ratio of Al/PGM catalyst of 5:1). The solution has a pH less than 7. The coating precursor forms negatively charged coating radicals. The surface of the catalyst support is positively charged. The mixture is fully stirred or milled at a temperature greater than 0° C. and less than or equal to 80° C. for a period greater or equal to a few minutes and less than or equal to a few days. The mixture is then filtrated and dried in ambient air or a vacuum at a temperature greater than or equal to room temperature to less than or equal to 100° C. for a time period greater than or equal to a few minutes to less than or equal to three days. The dry powder is then calcined at a temperature of greater than or equal to about 300° C. to less than or equal to about 600° C. for a time of greater than or equal to about 2 hours to less than or equal to about 10 hours to generate a first metal oxide coating.

A second sample 624 is prepared in accordance with certain aspects of the present disclosure to include a dual coating system including the first coating and a second coating formed from an aluminum oxide (alumina-$Al_2O_3$) catalyst support powder. A plurality of palladium (Pd) nanoparticles is bound to the surface of the $Al_2O_3$ at a concentration of 1.5 weight % Pd.

The support particles (with the catalyst nanoparticles) are added to an aqueous solution comprising a controlled amount of a first coating precursor comprising aluminum nitrate ($Al(NO_3)_3$)(e.g., $Al^{3+}$, mol ratio of Al/PGM catalyst of 5:1) and alumina sol (at a concentration of 10 wt. % of PGM/alumina catalyst) comprising 15-25% by mass aluminum hydroxide oxide (AlO(OH)), 1-5% by mass nitric acid, and 70-80% by mass water. The alumina sol is commercially available as CERAMABIND 644-A™ from Aremco. The solution has a pH less than 7.

The coating precursors form negatively charged coating radicals and a sol colloid. The surface of the catalyst support is positively charged. The mixture is fully stirred or milled at a temperature greater than 0° C. and less than or equal to 80° C. for a period greater or equal to a few minutes and less than or equal to a few days. The mixture is then filtrated and dried in ambient air or a vacuum at a temperature greater than or equal to room temperature to less than or equal to 100° C. for a time period greater than or equal to a few minutes to less than or equal to three days. The dry powder is then calcined at a temperature of greater than or equal to about 300° C. to less than or equal to about 600° C. for a time of greater than or equal to about 2 hours to less than or equal to about 10 hours to generate a first metal oxide coating and a second coating comprising a sol-gel oxide.

Figure 7:
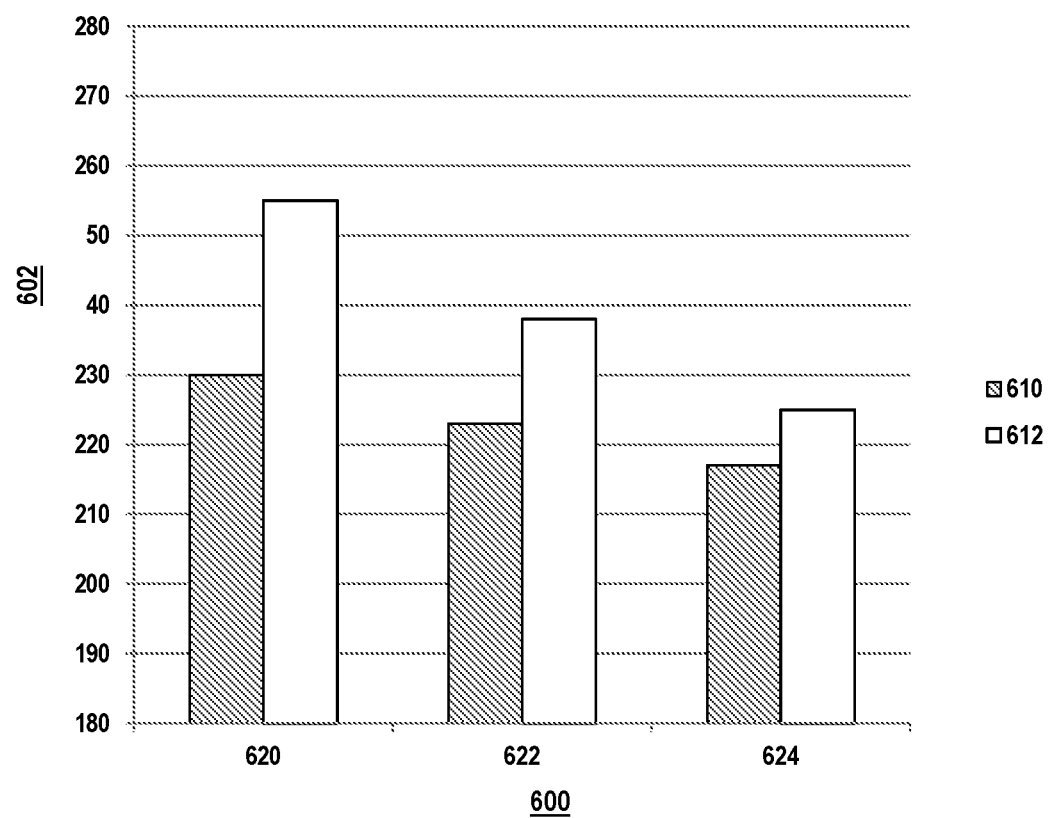
FIG. 7 is a chart showing comparative lightoff performance at a lightoff temperature of 50% conversion for carbon monoxide and propene for an uncoated Pd catalyst system as compared to a coated Pd catalyst system having a first coating or both a first coating and a second coating.

Each of control 620, first sample 622, and second sample 624 are aged at 950° C. for 48 hours in an atmosphere of 90 vol. % air and 10 vol. % water. Then, the lightoff performance is compared, as shown in FIG. 7. The x-axis 600 shows each of the control 620, first sample 622, and second sample 624. The y-axis 602 shows lightoff temperature (° C.). As seen in FIG. 7, a metric used to evaluate activity is $T_{50}$ (lightoff temperature), which is the temperature at which 50% of the CO and $C_3H_6$ streams are being oxidized over the catalyst, respectively. Series 610 shows the catalyst lightoff temperatures for carbon monoxide (CO), while series 612 shows the catalyst lightoff temperatures for propene ($C_3H_6$). The lower the lightoff temperature, the better the catalyst performance.

As can be seen, control 620 without any coatings with 1.5% Pd exhibits a CO lightoff temperature of 230° C. and a $C_3H_6$ lightoff temperature of 255° C. Comparatively, first sample 622 has the same catalyst loading at 1.5% Pd, but also has a first coating of an aluminum oxide shows a reduction in lightoff temperature of about 7° C. for CO (lightoff temperature of 223° C.) and 17° C. for $C_3H_6$ (lightoff temperature of 238° C.). Second sample 624 has the same catalyst loading at 1.5% Pd, but further has a dual coating sinter-resistant catalyst system prepared in accordance with certain aspects of the present disclosure including a first coating and a second coating. The lightoff temperatures are reduced by about 13° C. as compared to the control for CO lightoff temperature (217° C.) and about 30° C. for a $C_3H_6$ lightoff temperature (225° C.).

Thus, a dual coating sinter-resistant catalyst system prepared in accordance with certain aspects of the present disclosure shows significant improvement in lightoff temperature performance by reducing lightoff temperatures by about 13° C. for CO and 30° C. for $C_3H_6$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a sinter-resistant catalyst system, the method comprising:
    contacting a surface of a catalyst support in a particulate form with a first liquid precursor comprising a metal salt comprising an element selected from the group consisting of: aluminum (Al), cerium (Ce), zirconium (Zr), titanium (Ti), silicon (Si), magnesium (Mg), zinc (Zn), and combinations thereof, wherein the surface of the catalyst support comprises at least one bound active catalyst particle disposed thereon prior to the contacting of the surface with the first liquid precursor;
    precipitating or adsorbing the first liquid precursor on a portion of the surface of the catalyst support and calcining to form a first coating comprising a porous metal oxide on discrete regions of the surface;
    contacting the surface having the first coating comprising the porous metal oxide on discrete regions with a second liquid precursor comprising a sol comprising a metal oxide selected from the group consisting of: aluminum (Al), cerium (Ce), zirconium (Zr), iron (Fe), titanium (Ti), silicon (Si), and combinations thereof, wherein the contacting the surface with the second liquid precursor occurs after the contacting the surface of a catalyst support in the particulate form with the first liquid precursor; and
    forming a second coating comprising a porous metal oxide from the second liquid precursor on a portion of the surface of the catalyst support having the first coating comprising the porous metal oxide on discrete regions, so that the catalyst support comprises a dual coating comprising the first coating and the second coating to create the sinter-resistant catalyst system.

2. The method of claim 1, further comprising applying the sinter-resistant catalyst system as a washcoat layer over a monolith substrate.

3. The method of claim 1, wherein the active catalyst particle comprises a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof.

4. The method of claim 1, wherein after the contacting of the surface of the catalyst support with a first liquid precursor, the method further comprises filtering the catalyst support in the particulate form from a liquid, drying the catalyst support, conducting the calcining, and then contacting of the surface with the second liquid precursor.

5. The method of claim 1, wherein the calcining comprises heating to greater than or equal to about 300° C. to less than or equal to about 600° C. for greater than or equal to about 2 hours.

6. The method of claim 1, wherein the catalyst support comprises a metal oxide selected from the group consisting of: aluminum oxide ($Al_2O_3$), cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

7. The method of claim 1, wherein the metal salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

8. The method of claim 1, wherein prior to the contacting of the surface of the catalyst support with a first liquid precursor, the method further comprises pretreating the catalyst support by hydrothermally treating the catalyst support to a temperature of greater than or equal to about 800° C. to less than or equal to about 1,200° C. in the presence of water and air; and binding an active catalyst particle with the surface of the catalyst support.

9. A method of preparing a sinter-resistant catalyst system, the method comprising:
contacting a surface of a catalyst support in a particulate form with a first liquid precursor comprising a metal salt comprising aluminum (Al), wherein the surface of the catalyst support comprises at least one bound active catalyst particle disposed thereon prior to the contacting of the surface with the first liquid precursor;
precipitating or adsorbing the first liquid precursor on a portion of the surface of the catalyst support and calcining to form a first coating comprising a porous aluminum oxide on discrete regions of the surface;
contacting the surface having the first coating comprising the porous metal oxide on discrete regions with a second liquid precursor comprising a sol comprising a metal oxide selected from the group consisting of: aluminum (Al), cerium (Ce), zirconium (Zr), iron (Fe), titanium (Ti), silicon (Si), and combinations thereof, wherein the contacting the surface with the second liquid precursor occurs after the contacting the surface of a catalyst support in a particulate form with the first liquid precursor; and
forming a second coating comprising a porous metal oxide from the second liquid precursor on a portion of the surface of the catalyst support having the first coating comprising the porous metal oxide on discrete regions, so that the catalyst support comprises a dual coating comprising the first coating and the second coating to create the sinter-resistant catalyst system.

10. A method of preparing a sinter-resistant catalyst system, the method comprising:
contacting a surface of a catalyst support in a particulate form with a first liquid precursor comprising a metal salt comprising an element selected from the group consisting of: aluminum (Al), cerium (Ce), zirconium (Zr), titanium (Ti), silicon (Si), magnesium (Mg), zinc (Zn), and combinations thereof, wherein the surface of the catalyst support comprises at least one bound active catalyst particle disposed thereon prior to the contacting of the surface with the first liquid precursor;
precipitating or adsorbing the first liquid precursor on a portion of the surface of the catalyst support and calcining to form a first coating comprising a porous metal oxide on discrete regions of the surface;
contacting the surface having the first coating comprising the porous metal oxide on discrete regions with a second liquid precursor comprising a sol comprising a metal oxide selected from the group consisting of: aluminum (Al), cerium (Ce), zirconium (Zr), iron (Fe), titanium (Ti), and combinations thereof, wherein the contacting the surface with the second liquid precursor occurs after the contacting the surface of a catalyst support in a particulate form with the first liquid precursor; and
forming a second coating comprising a porous metal oxide from the second liquid precursor on a portion of the surface of the catalyst support having the first coating comprising the porous metal oxide on discrete regions, so that the catalyst support comprises a dual coating system comprising the first coating and the second coating to create the sinter-resistant catalyst system.

* * * * *